United States Patent [19]
Tachibana et al.

[11] 3,883,499

[45] May 13, 1975

[54] PEPTIDE AND PROCESS FOR PREPARING SAME FROM FROG SKIN

[75] Inventors: Shinro Tachibana, Narashino; Kengo Araki, Niiza, both of Japan

[73] Assignee: Eisai Co., Ltd., Tokyo, Japan

[22] Filed: Aug. 8, 1973

[21] Appl. No.: 386,538

[30] Foreign Application Priority Data
Aug. 18, 1972 Japan.............................. 47-82103

[52] U.S. Cl.............................. 260/112.5; 424/177
[51] Int. Cl.. C07c 103/52; C07g 7/00; A61k 27/00
[58] Field of Search.................. 260/112.5; 424/177

[56] References Cited
OTHER PUBLICATIONS

Anastasi et al., Brit. J. Pharmacol., 3B, 221–228 (1970).

Anastasi et al., Arch. Biochem. Biophys., 108, 341–348 (1964).

*Primary Examiner*—Lewis Gotts
*Assistant Examiner*—Reginald J. Suyat
*Attorney, Agent, or Firm*—Woodhams, Blanchard & Flynn

[57] ABSTRACT

A novel octapeptide is obtained by extracting the skin of an African frog (*Xenopus laevis pipidae*) with a lower alcohol, removing the solvent from the extract and subjecting the residue, in an optional order, to strongly acidic ion exchange resin chromatography, strongly basic ion exchange resin chromatography, gel filtration and droplet counter current partition chromatography.

1 Claim, No Drawings

3,883,499

PEPTIDE AND PROCESS FOR PREPARING SAME FROM FROG SKIN

BACKGROUND OF THE INVENTION

1. Field of the Invention

This invention relates to a process for preparing from the skin of an African frog a novel octapeptide having a contracting activity on a strip of fundus from a rat stomach and guinea-pig ileum in vitro and a hypotensive activity on rats.

2. Description of the Prior Art

Valuable Chinese medicines represented by a toad poison, "toad-cake," have been prepared from frogs from ancient times. Steroid compounds, histamine compounds, adrenaline compounds and serotonin compounds have heretofore been isolated from frog skins.

It has recently been found that in addition to these compounds, peptides having various biological and pharmacological activities are present in frog skins. As such peptides, there are known not only a group of bradykinins and derivatives thereof, but also caerulein having a strong contracting activity on gall bladder (Arch. Biochem. Biophys., 125, 57 (1968)), phyllomedisin having a hypotensive activity (Experientia, 26, 282 (1970)), ranatensin having both a contracting activity on smooth muscle and a hypertensive activity (Fedr. Proc., 29, 282 (1970)), and alytesin and bombesin having a contracting activity on smooth muscle and a hypertensive activity (Experientia, 27, 166 (1971)).

SUMMARY OF THE INVENTION

We have discovered that a novel peptide substance can be obtained from the skin of African frog (*Xenopus laevis pipidae*). We have further discovered that this substance has a contracting activity on rat stomach strip and a hypotensive activity.

In practicing the process of this invention, the skin of African frog is finely cut and then is extracted with a lower alcohol (ROH in which R is alkyl of 1 to 4 carbon atoms). Preferred lower alcohols include methanol, ethanol, isopropanol and the like. It is preferred that a very small amount, in the range of 0.01 to 1 percent by weight, based on the weight of the lower alcohol, of an aqueous solution of trichloroacetic acid is added to such lower alcohol. Trichloroacetic acid inhibits activities of enzymes and prevents decomposition of the intended product peptide of this invention. The solvent is then removed from the extract, and the residue is subjected, in an optional order, to (1) strongly acidic ion exchange resin chromatography, (2) strongly basic ion exchange resin chromatography, (3) gel filtration and (4) droplet countercurrent partition chromatography. There is obtained a fraction having a contracting activity on rat stomach strip and a hypotensive activity on rats. One or more of the foregoing treatments (1) to (4) may be repeated several times according to need. The order or sequence of these four treatments is not critical. These treatments can be carried out in various orders or sequences with satisfactory results.

As the strongly acidic ion exchange resin, there can be employed, for example SE-Sephadex (trademark for the product of Pharmacia Co.), SP-Sephadex (trademark for the product of Pharmacia Co.), Dowex 50W (trademark for the product of Dow Chemical Co.), Amberlite CG-120 (trademark for the product of Rohm & Haas Co.) and the like. As the strongly basic ion exchange resin, there can be employed, for example, QAE-Sephadex (trademark for the product of Pharmacia Co.), Dowex 1 or 2 (trademark for the product of Dow Chemical Co.), Amberlite CG 400 (trademark for the product of Rohm & Haas Co.) and the like. As the gel filter, there can be employed, for example, Sephadex G-25 (trademark for the product of Pharmacia Co.), Bio-Gel P-4 (trademark for the product of Bio-Laboratories Co.) and the like.

An example of a suitable droplet counter-current partition chromatography is as follows. Employing a liquid composed of n-butanol:acetic acid:water (4:1:5 parts by volume), a stationary liquid phase is formed as the upper layer and the substance to be purified is charged in the dissolved state into the lower layer of the column. The resulting fraction having a contracting activity on rat stomach strip is dried according to need. Thus is obtained the peptide product of this invention.

As a result of amino-acid analysis of the resulting peptide product, it was confirmed that the peptide product contains 1 mole equivalent of each of proline, glycine, glutamic acid, lysine, arginine, isoleucine and leucine. Tryptophan was also determined by the optical density at 280 m$\mu$. Thus, the peptide product consists of 8 amino acids.

The structure of the peptide of this invention is analyzed as follows:

1. Chymotrypsin Cleavage:

When the dansylated (dimethylaminonaphthalenesulfonylated) peptide (D-P) is subjected to chymotrypsin degradation, a dansyl-decomposed peptide (C-1) is formed. As a result of amino acid analysis, it is found that C-1 has a composition of lysine (1), arginine (1), glutamic acid (1), proline (1), glycine (1) and tryptophan (1). Accordingly, in view of the substrate specificity of chymotrypsin, it is seen that the C-terminal amino acid of C-1 is composed of tryptophan.

2. Trypsin Cleavage:

When D-P is subjected to an action of trypsin, a dansyl-decomposed peptide (T-1) is formed. As a result of amino acid analysis, it is found that T-1 has a composition of lysine (1), arginine (1), glycine (1), and glutamic acid (1). In view of the substrate specificity of trypsin, it is seen that the C-terminal amino acid of T-1 is composed of arginine.

3. Papain Cleavage:

When D-P is subjected to an action of papain, a dansyl-decomposed peptide (P-1) is formed. As a result of amino acid analysis, it is seen that P-1 has a composition of lysine (1), glutamic acid (1) and glycine (1).

4. Degradation of C-1 by Carboxypeptidase:

C-1 is decomposed by carboxypeptidase A, and the reaction liquid is directly analyzed by an amino acid analyzer. As a result, only the presence of tryptophan is detected. The remaining reaction liquor is subjected to an action of carboxypeptidase B and the reaction liquor is directly analyzed by an amino acid analyzer. As a result, it is found that any amino acid other than tryptophan is not released. When the above results are considered in the light of the amino acid compositions of T-1 and P-1, it is seen that the penultimate amino acid positioned before tryptophan is proline.

5. Birch reduction:

The peptide is subjected to Brich reduction and the resulting reaction liquor is subjected to amino acid analysis. As a result arginine is found to have been drastically reduced. In view of this fact it is seen that the amino acid positioned before proline is arginine.

When the results described in (1) to (5) above are considered collectively, it is recognized that the peptide has an amino acid arrangement of (lysine.glycine.-glutamic acid).arginine.proline.tryptophan.(isoleucine leucine). As regards the parenthesized portions, the amino acid arrangement cannot be determined from the foregoing results.

6. Analysis of C-Terminal Fragment:

D–P is digested with chymotrypsin and dansylated to separate dansylated (isoleucine leucine) (C–2). Then, C–2 is hydrolyzed. As a result, the presence of dansylated isoleucine is detected. The peptide is further subjected to an action of carboxypeptidase A, and the reaction liquid is directly analyzed by an amino acid analyzer. Leucine is detected and only a very minute amount of isoleucine is detected. From this result it is seen that the sequence of C–2 is isoleucine.leucine (free form).

7. Analysis of N-Terminal Amino Acid:

D–P is hydrolyzed at 100°C. for 16 hours with 6N hydrochloric acid, and the dansylated amino acid is determined and it is found that the dansylated amino acid is $\epsilon$-dansylated-lysine. Accordingly, it is seen that the N-terminus is blocked. D–P is hydrolyzed in 1N caustic soda and allowed to stand still at 27°C. for 75 hours. Then, it is neutralized with acetic acid, dansylated and hydrolyzed with hydrochloric acid. As a result of identification of the dansylated amino acid, it is found that in addition to $\epsilon$-dansylated-lysine, dansylated glutamic acid is present. Accordingly, it is seen that the N-terminal amino acid is composed of pyroglutamic acid.

8. Analysis of C-terminal Amino Acid of P–1:

P–1 has an amino acid arrangement of pyroglutamic acid. (lysine.glycine). The C-terminal amine acid of P–1 is determined by the tritium labelling method (Biochemical and Biophysical Research Communication, 43, 1334 (1971)). As a result, it is confirmed that the C-terminal amino acid is composed of lysine. Thus, P–1 is found to have an amino acid arrangement of pyroglutamic acid.glycine.lysine.

From the foregoing results, it is found that the peptide of this invention has the following structure:

pyroglutamic acid.glycine.lysine.arginine.proline. tryptophan.isoleucine.leucine The following figure shows the attack sites of each enzyme to the dansylated peptide on the above mentioned procedure for structural determination.

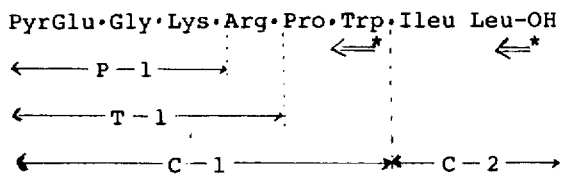

*carboxypeptidase A

The peptide of this invention has the following pharmacological activities at animal tests:

1. Contracting Activity on Rat Stomach Strip (measured by the method of Magnus):
    threshold dose = 0.1 ng/ml
    dose-response: observed
2. Contracting Activity on Guinea Pig Ileum (measured by the method of Magnus):
    threshold dose = 10 ng/ml
    dose-response: not observed (one relaxed and then contracted)
3. Hypertensive Activity on Rats
    threshold dose = 1.2 µg/Kg
    tachyphylaxis: observed Accordingly, it is seen that the peptide of this invention is a valuable substance which possesses hypotensive and gastrointestinal movement-promoting properties.

Further, the peptide of this invention has the following physical properties:
   Rf values of dansylated peptide for thin layer chromatography on silica gel;
   Rf : 0.37 (solvent system - methylacetate:isopropanol:ammonia = 9:7:4)
   Rf : 0.27 (solvent system - n-butanol:acetic acid:water = 4:1:5)

This invention will now be further described by reference to the following illustrative example, in which the term "active fraction" means a fraction having a contracting activity on rat stomach strip.

EXAMPLE 1

2 l of methanol containing 5 vol.% of a 6 wt.% aqueous solution of trichloroacetic acid was added to fresh skins of 30 African frogs, and the skins were allowed to stand still in a refrigerator maintained at about –20°C. for a week. The resulting extract was separated from the solid residue and then the extract was concentrated under reduced pressure and dried to obtain solids (1.2g).

A column having an inner diameter of 3 cm and a length of 60 cm was packed with SE-Sephadex C-25 well-bufferized with 0.1 M ammonium formate (pH = 7.5). The solids were dissolved in 20 ml of 0.001 N formic acid and the solution was charged in the column. The gradient elution was effected with the use of 2 l of water and 2 l of 0.5 M ammonium formate (pH = 6.5) at an elution rate of 60 ml/hr and at a unit fraction volume of 15 ml. Active fractions (75th to 90th fractions) were collected and lyophilized.

A second column having an inner diameter of 4.5 cm and a length of 50 cm was packed with Sephadex G-25 well-bufferized with 0.1 N acetic acid. The lyophilized product was dissolved in 5 ml of 0.1 N acetic acid and the solution was charged in the column. The development elution was effected with the use of the same solvent at an elution rate of 20 ml/hr and at a unit fraction volume of 3 ml. Active fractions (45th to 55th fractions) were collected and lyophilized. This lyophilized product was dissolved in 1 ml of 0.001 N aqueous ammonia and the solution was charged in a third column having a diameter of 0.9 cm and a length of 50 cm, in which was charged QAE-Sephadex (A-25) bufferized sufficiently with 0.001 N aqueous ammonia. The development elution was effected with the use of 0.001 N aqueous ammonia at an elution rate of 12 ml/hr and a unit fraction volume of 3 ml. Active fractions (8th to 15th fractions) were collected and lyophilized:

The lyophilized product was purified by droplet counter-current partition chromatography by employing a column having an inner capacity of 240 ml. More specifically, an upper layer of a liquid of n-butanol:acetic acid:water (4:1:5) was used as the stationary phase, and the lyophilized product was dissolved in the water layer as the lower layer. The resulting aqueous solution was added dropwise to the stationary phase and the elution was effected at an elution rate of 3 ml/hr and at a unit fraction volume of 3 ml. Active fractions (48th to 100th fractions) were collected, and concentrated under reduced pressure and dried to solids. The solids were dissolved in 0.5 ml of 0.001 N formic acid and the solution was charged in a column of a diameter of 0.9 cm and a length of 30 cm packed with SE-Sephadex C-25 bufferized sufficiently with a 0.1 M ammonium formate liquor (pH = 6.5). The development elution was effected at an elution rate of 15 ml/hr and a unit fraction volume of 3 ml with use of 0.05 M ammonium formate (pH = 6.5). Active fractions (47th to 63rd fractions) were collected and lyophilized to obtain 750 μg of a white powdery peptide.

This peptide was dansylated (dimethylaminonaphthalene-sulfonylated) and was subjected to the silica gel thin layer chromatography by employing two kinds of development solvents, namely a liquid of butanol:acetic acid:water (4:1:5) and a liquid of methyl acetate:isopropanol:ammonia (9:7:4). As a result, it was confirmed that the obtained peptide was a single substance.

The embodiments of the invention in which an exclusive property or privilege is claimed are defined as follows:

1. An octapeptide compound consisting of the following amino acids arranged in the following order and wherein the configurations of all the amino acids are L:

pyroglutamic acid.glycine.lysine.arginine.proline.tryptophan.isoleucine.leucine.

* * * * *